Feb. 18, 1936. F. G. BOVARD 2,031,203

CABLE CLAMP ATTACHMENT

Filed Nov. 23, 1934

INVENTOR
Floyd G. Bovard
BY *Alphens J. Crane*
ATTORNEY

Patented Feb. 18, 1936

2,031,203

UNITED STATES PATENT OFFICE 2,031,203

CABLE CLAMP ATTACHMENT

Floyd G. Bovard, Akron, Ohio, assignor to The Ohio Brass Company, Mansfield, Ohio, a corporation of New Jersey Application November 23, 1934, Serial No. 754,458

12 Claims. (Cl. 24—135)

This invention relates to attachments for cable clamps and has for one of its objects the provision of means for securing armor rods or other protection devices to a cable adjacent the point where it enters a supporting clamp.

A further object is to provide a device of the class named which may be readily applied to cable clamps already in use without modification of the clamp itself.

A further object of the invention is to provide a device of the class named which shall be economical to manufacture, easy to install and efficient in operation.

Other objects and advantages will appear from the following description.

The invention is exemplified by the combination and arrangement of parts shown in the accompanying drawing and described in the following specification, and it is more particularly pointed out in the appended claims.

Figure 2:
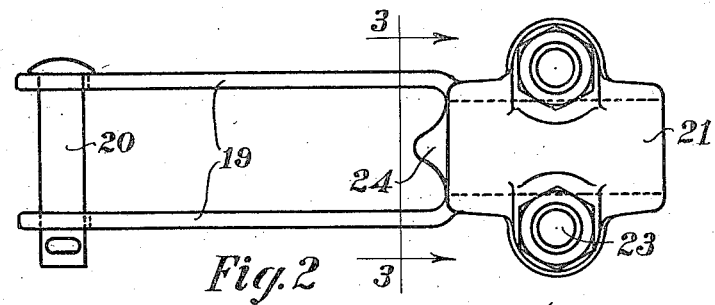
Fig. 2 is a top plan view of the cable clamp attachment.
Figure 1:
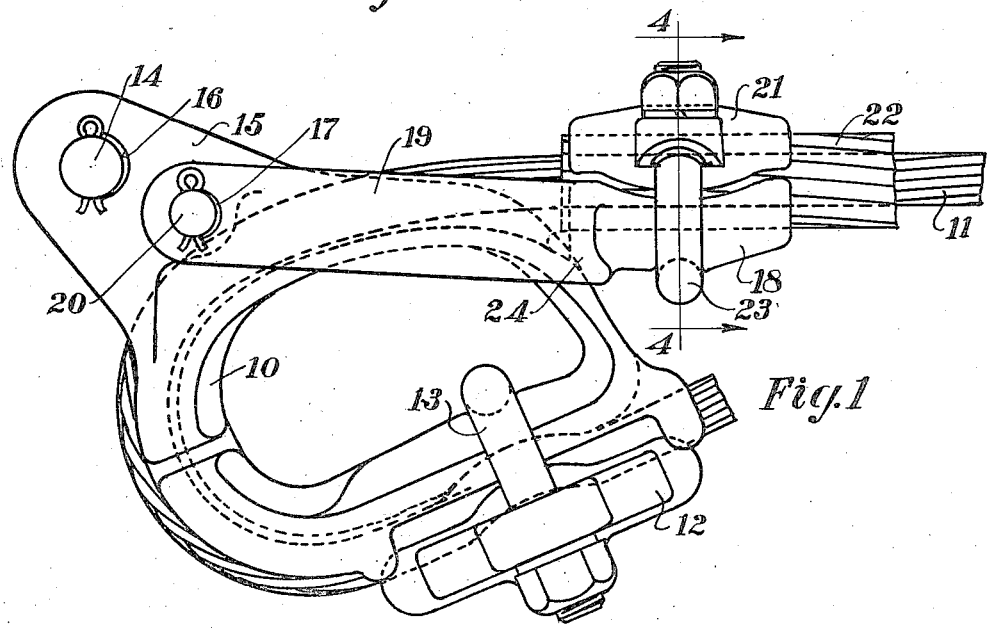
Fig. 1 is a side view of a cable clamp having one embodiment of the present invention applied thereto.
Figure 3:
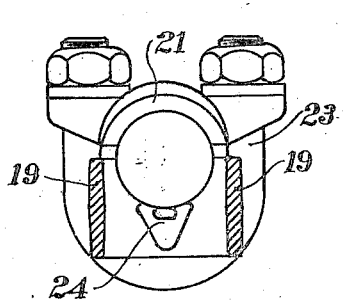
Fig. 3 is a section on line 3—3 of Fig. 2.
Figure 4:
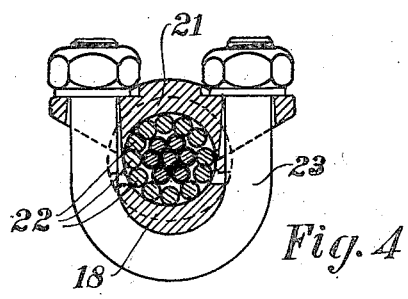
Fig. 4 is a section on line 4—4 of Fig. 1.

Various forms of cables, and particularly electrical conductors, when suspended by supporting clamps, are subject to vibration, which in time is apt to cause fatigue of the metal forming the cable, resulting in breaking of the cable. The cable is particularly subject to this destructive effect at the point where it enters its supporting clamp.

Many devices have been devised for minimizing the destructive effect of vibration, one form of device for this purpose being shown in Patent No. 1,873,798, granted April 23, 1932 to T. Varney. The device comprises a plurality of tapered bars or rods which envelop the cable and extend for some distance away from the clamp. A special form of clamp having a seat large enough to receive the armor rods is shown in the Varney patent. The present invention provides means by which damping rods, similar to those of the Varney patent, may be attached to other forms of clamps than that shown in the patent without the necessity of modifying the clamp to receive the armor rods. The present invention makes it possible to apply the damping rods to clamps already installed without the necessity of providing new clamps of special form.

The invention as shown in the drawing is applied to a clamp similar to that disclosed in Patent No. 1,825,913, granted October 6, 1931 to H. E. McDowell, but it will be understood that the invention may be applied to other forms of clamp than that illustrated in the drawing.

In the drawing the numeral 10 designates a dead end clamp having a curved seat about which the cable 11 is wound, the end of the cable being secured by a keeper bar 12 and U-bolt 13. The snubbing action of the clamp seat very materially assists in holding the cable. The clamp is attached to any suitable support by a clevis pin 14, and the tension on the cable will hold the clamp in such position that the center of the pin 14 will be in alinement with the axis of the cable 11. The ears 15 of the cable 10 are provided with an opening 16 for the pin 14 and also with an opening 17 which is used to hold the cable in its seat while the clamp is being attached to its support.

In installing the clamp, the end of the cable is first secured by the keeper 12 and then wound about its seat, after which a pin is placed in the opening 17 to hold the cable from unwinding until it has been subected to tension. The pin is then removed from the opening 17. In the present invention the opening 17 is utilized for the further purpose of attaching the armor rod grip to the clamp.

The armor rod grip comprises a lower jaw 18 having rearwardly extending spaced parallel arms 19 which are perforated to receive a pin 20. An upper jaw 21 cooperates with the lower jaw 18 to hold the armor rods 22 in place on the cable 11. The jaws 18 and 21 are held together by a U-bolt 23. The lower jaw 18 is provided with a seat 24 which rests against the clamp 10 when the attachment is in place. In applying the armor rod grip, the rods 22 will be placed in position and temporarily held in any suitable manner. The lower jaw 18 will be placed against the under face of the bundle of rods 22 and the right hand portion of the clamp 10 drawn down slightly against the tension of the cable 11 partially to unwind the cable from its seat. The jaw 18 is then moved to the left so that seat 24 bears snugly against the groove in the clamp 10. This will bring the openings in the arms 19 in registration with the openings in the ears 15 so that the pin 20 may be slid in place. The upper jaw 21 is then clamped to the lower jaw 18 by the U-bolt 23 so as to grip firmly the rods 22 and hold them in place upon the cable 11. After the pin 20 is in position, the downward tension on the right hand end of the clamp 10 is released, permitting it to swing up slightly under the tension of the cable 11 so as to insure firm pressure of the seat 24 against the clamp. By this arrangement the gripper jaws 18 and 21 will be held in fixed position relative to the clamp and firmly secure the vibration damper rods 22 in place on the cable 11. In case it is desired to use the attachment in connection with cable clamps not already provided with openings 17, it will only be necessary to bore a hole through the clamp slightly out of alinement with the axis of the cable so that tension on the cable will hold the gripper jaws firmly against a seat on the clamp.

Modifications of the invention necessary for its application to other forms of clamps will readily suggest themselves to those skilled in the art.

I claim:

1. The combination with a cable, of a clamp for supporting said cable, armor rods enclosing said cable adjacent said clamp, a pair of jaws gripping said armor rods and holding said armor rods in place on said cable, and a link rigid with one of said jaws and pivotally connected with said clamp.

2. The combination with a cable, of a clamp for supporting said cable, armor rods surrounding said cable adjacent said clamp, an attachment for gripping said armor rods, and means for holding said attachment in a position in which a portion thereof is interposed between said cable and said clamp so that said attachment is pressed against said clamp by the tension in said cable.

3. The combination with a cable, of a clamp for holding said cable, an attachment for said cable formed separately from said clamp and means for holding said attachment in a position in which a portion thereof is interposed between said cable and said clamp so that said attachment is held in fixed position relative to said clamp by the tension in said cable.

4. The combination with a cable, of a protective device secured to said cable, said device having pivotal connection with said clamp and means fixed to said device and disposed between said clamp and cable for holding said device from movement about the axis of its pivotal connection.

5. The combination with a cable, of a clamp for supporting said cable, a pivotal support for said clamp, said clamp being movable upon its pivotal support to permit the axis of said cable to assume a position in line with the axis of said pivotal support, protection means attached to said cable adjacent said clamp, a gripper for said protection means having pivotal connection with said clamp and having bearing against said clamp at a point spaced from the point of pivotal connection with said clamp and held in contact with said clamp at its bearing point by the tension in said cable.

6. The combination with a cable, of a clamp having a snubbing seat upon which said cable is wound, a pivotal support for said clamp, a protection device secured to said cable adjacent said clamp and having bearing against said clamp at a point tending to unwind said cable from its snubbing seat so that the tension on said cable presses said protection device against said clamp at said point.

7. An attachment for holding armor rods to a cable in fixed relation to a supporting clamp comprising a pair of gripper jaws, means for clamping said jaws together, an extension on one of said jaws, and means for pivotally securing said extension to a cable clamp.

8. An attachment for holding a protection device in operative relation to a cable and a cable clamp comprising a pair of gripper jaws, means for clamping said jaws together, a pair of spaced parallel arms extending from one of said jaws, and means for pivotally connecting the ends of said arms to a cable clamp.

9. The combination with a cable, of a clamp for supporting said cable, armor rods surrounding said cable adjacent said clamp, a gripping device for holding said armor rods in position, said gripping device being pivotally connected with said clamp and engaging said clamp at a point spaced from its pivotal connection therewith and pressed against said clamp at said point by the tension in said cable.

10. The combination with a clamp having a curved seat thereon, of a cable wound about said seat, means for gripping said cable to said seat, a pivotal support for said clamp, a pair of arms pivoted to said clamp and disposed at opposite sides thereof, a clamping jaw fixed to said arms in spaced relation to the point of pivotal support of the arms on said clamp, a complementary jaw, means for clamping said jaw together, and armor rods enclosing said cable and held in position thereon by said clamping jaws.

11. In combination a clamp having a curved seat thereon, a cable wound about said seat, means for securing said cable to said clamp, a pivotal support for said clamp, armor rods surrounding said cable adjacent said clamp, gripping means for holding said armor rods in position on said cable, and an arm fixed to said gripping means and pivoted to said clamp, said gripping means being pressed against said clamp by tension on said cable.

12. Means for securing armor rods to a cable clamp having a pivotal support and a snubbing seat, said means comprising a pair of gripper members having complementary recesses therein for engaging a set of armor rods surrounding the cable held by said clamp, means for clamping said gripper members together upon said armor rods, and a pair of arms extending from one of said gripper members in the direction of the axis of the cable held by said gripper members, and means for pivotally connecting the ends of said arms with the cable clamp at one side of the axis of said cable.

FLOYD G. BOVARD.